US00RE50895E

(19) United States
(12) Reissued Patent
Jaglan

(10) Patent Number: US RE50,895 E
(45) Date of Reissued Patent: *May 19, 2026

(54) MATERIALS AND METHODS FOR MITIGATING THE HARMFUL EFFECTS OF BLUE LIGHT

(71) Applicant: BLUE LIGHT EYE PROTECTION, INC., Smyrna, GA (US)

(72) Inventor: Parveen Jaglan, Atlanta, GA (US)

(73) Assignee: BLUE LIGHT EYE PROTECTION, INC., Atlanta, GA (US)

( * ) Notice: This patent is subject to a terminal disclaimer.

(21) Appl. No.: 18/204,198

(22) Filed: May 31, 2023

Related U.S. Patent Documents

Reissue of:
(64) Patent No.: 11,022,821
Issued: Jun. 1, 2021
Appl. No.: 16/173,280
Filed: Oct. 29, 2018

U.S. Applications:
(63) Continuation of application No. 15/309,122, filed as application No. PCT/US2015/029492 on May 6,
(Continued)

(51) Int. Cl.
*G02C 7/02* (2006.01)
*G02B 5/28* (2006.01)
*G02C 7/10* (2006.01)

(52) U.S. Cl.
CPC ..... *G02C 7/104* (2013.01); *G02B 5/283* (2013.01); *G02B 5/285* (2013.01); *G02C 7/107* (2013.01)

(58) Field of Classification Search
CPC ..... G02C 7/104
See application file for complete search history.

(56) References Cited

U.S. PATENT DOCUMENTS 3,963,330 A 6/1976 Boniuk
4,470,673 A 9/1984 Gilson et al.
(Continued)

FOREIGN PATENT DOCUMENTS

JP 2003-112391 A 4/2003
JP 2008-169312 A 7/2008
(Continued)

OTHER PUBLICATIONS

Standard Practice for Calculating Yellowness and Whiteness Indices from Instrumentally Measured Color Coordinates. Designation: E313-10. (Year: 2010).*
(Continued)

*Primary Examiner* — Deandra M Hughes
(74) *Attorney, Agent, or Firm* — Sughrue Mion, PLLC

(57) ABSTRACT

Provided herein are optically transparent materials configured to block an appropriate amount of incident blue light, such that when the materials are positioned in the optical path between environmental light and the retina of a user, the optically transparent materials reduce the amount of blue light from the environmental light that reaches the retina of a user. The materials can block an effective amount of blue light to minimize damage to retinal tissue while permitting transmission of an effective amount of maintain acceptable photopic vision, scotopic vision, color vision, and circadian rhythms.

23 Claims, 2 Drawing Sheets

Related U.S. Application Data

2015, now Pat. No. 10,114,233, which is a continuation of application No. 14/553,213, filed on Nov. 25, 2014, now Pat. No. 9,057,887.

(60) Provisional application No. 62/069,432, filed on Oct. 28, 2014, provisional application No. 61/989,041, filed on May 6, 2014.

(56) References Cited

U.S. PATENT DOCUMENTS

| | | | | |
|---|---|---|---|---|
| 4,542,964 | A | 9/1985 | Gilson et al. | |
| 5,135,808 | A | 8/1992 | Kimock et al. | |
| 5,400,175 | A | 3/1995 | Johansen et al. | |
| 5,662,707 | A | 9/1997 | Jinkerson | |
| 5,694,240 | A | 12/1997 | Sternbergh | |
| 5,952,096 | A | 9/1999 | Yamashita et al. | |
| 6,410,173 | B1 | 6/2002 | Arfsten et al. | |
| 6,486,226 | B2 | 11/2002 | Al-Akhdar et al. | |
| 6,600,589 | B1 | 7/2003 | Berneth et al. | |
| 6,641,261 | B2 | 11/2003 | Wang et al. | |
| 6,682,193 | B1 | 1/2004 | Morris et al. | |
| 6,777,459 | B2 | 8/2004 | Al-Akhdar et al. | |
| 6,793,339 | B1 | 9/2004 | Yip et al. | |
| 6,852,406 | B2 | 2/2005 | Marechal | |
| 6,955,430 | B2 | 10/2005 | Pratt | |
| 6,984,038 | B2 | 1/2006 | Ishak | |
| 7,004,583 | B2 | 2/2006 | Miniutti et al. | |
| 7,008,690 | B2 | 3/2006 | Caron et al. | |
| 7,029,118 | B2 | 4/2006 | Ishak | |
| 7,055,954 | B2 | 6/2006 | Marechal | |
| 7,066,596 | B2 | 6/2006 | Ishak | |
| 7,255,435 | B2 | 8/2007 | Pratt | |
| 7,278,737 | B2 | 10/2007 | Mainster et al. | |
| 7,278,738 | B2 | 10/2007 | Hsu | |
| 7,423,110 | B2 | 9/2008 | El-Hibri | |
| 7,520,608 | B2 | 4/2009 | Ishak et al. | |
| 7,625,626 | B2 | 12/2009 | Bear et al. | |
| 7,691,918 | B2 | 4/2010 | Jinkerson et al. | |
| 7,717,557 | B2 | 5/2010 | Kobayashi et al. | |
| 7,976,157 | B2 | 7/2011 | Croft et al. | |
| 7,978,409 | B2 | 7/2011 | Tanaka et al. | |
| 8,047,650 | B2 | 11/2011 | Mainster et al. | |
| 8,210,678 | B1 | 7/2012 | Farwig | |
| 8,292,428 | B2 | 10/2012 | Mainster et al. | |
| 8,342,681 | B2 | 1/2013 | Croft et al. | |
| 8,360,574 | B2 | 1/2013 | Ishak et al. | |
| 8,394,906 | B2 | 3/2013 | Christ | |
| 8,403,478 | B2 | 3/2013 | Ishak | |
| 8,425,035 | B2 | 4/2013 | von Blanckenhagen | |
| 8,469,512 | B2 | 6/2013 | Croft et al. | |
| 8,500,274 | B2 | 8/2013 | Ishak | |
| 8,512,604 | B2 | 8/2013 | Berzon et al. | |
| 8,529,059 | B2 | 9/2013 | Suzuki | |
| 8,534,833 | B2 | 9/2013 | Cado et al. | |
| 8,541,526 | B2 | 9/2013 | Jethmalani et al. | |
| 8,570,648 | B2 | 10/2013 | Sanchez Ramos | |
| 8,591,026 | B2 | 11/2013 | Conte et al. | |
| 8,882,267 | B2 | 11/2014 | Ishak et al. | |
| 9,057,887 | B1 * | 6/2015 | Jaglan | G02B 5/285 |
| 9,134,547 | B2 | 9/2015 | McCabe et al. | |
| 9,169,373 | B2 | 10/2015 | Chiu et al. | |
| 9,683,102 | B2 | 6/2017 | Cefalo et al. | |
| 9,778,490 | B2 | 10/2017 | Pritts | |
| 9,933,635 | B2 | 4/2018 | Hashimoto et al. | |
| 10,025,117 | B2 | 7/2018 | Takedomi et al. | |
| 10,114,233 | B2 * | 10/2018 | Jaglan | G02B 5/285 |
| 10,114,234 | B2 | 10/2018 | Jallouli et al. | |
| 10,203,524 | B2 | 2/2019 | Baillet | |
| 10,330,953 | B2 | 6/2019 | De Ayguavives et al. | |
| 10,371,867 | B2 | 8/2019 | Tomoda et al. | |
| 10,508,178 | B2 | 12/2019 | Smetana | |
| 11,086,145 | B2 | 8/2021 | Flinders | |
| 11,401,400 | B2 | 8/2022 | Shishino et al. | |
| 11,505,675 | B2 * | 11/2022 | Chiu | C08K 5/12 |
| 11,513,258 | B2 * | 11/2022 | Ogo | G02B 1/115 |
| 2004/0070726 | A1 | 4/2004 | Ishak | |
| 2005/0018131 | A1 | 1/2005 | Ishak | |
| 2005/0243272 | A1 | 11/2005 | Mainster et al. | |
| 2007/0077410 | A1 | 4/2007 | Shi | |
| 2008/0221674 | A1 | 9/2008 | Blum et al. | |
| 2008/0278676 | A1 | 11/2008 | Croft et al. | |
| 2010/0066974 | A1 | 3/2010 | Croft et al. | |
| 2010/0096011 | A1 | 4/2010 | Griffiths et al. | |
| 2011/0075096 | A1 | 3/2011 | Ishak et al. | |
| 2011/0120554 | A1 | 5/2011 | Chhajed et al. | |
| 2011/0141432 | A1 | 6/2011 | Nesty | |
| 2012/0008217 | A1 | 1/2012 | Ishak et al. | |
| 2012/0057236 | A1 * | 3/2012 | Broadway | G02B 1/115 359/586 |
| 2012/0062833 | A1 | 3/2012 | Fukagawa | |
| 2012/0086905 | A1 | 4/2012 | Croft et al. | |
| 2012/0259411 | A1 | 10/2012 | Hong et al. | |
| 2012/0300170 | A1 | 11/2012 | Fournand et al. | |
| 2012/0307194 | A1 | 12/2012 | Croft et al. | |
| 2013/0009059 | A1 | 1/2013 | Caruso | |
| 2013/0010251 | A1 | 1/2013 | Croft et al. | |
| 2013/0038834 | A1 | 2/2013 | Cado et al. | |
| 2013/0050636 | A1 | 2/2013 | Fuckagawa | |
| 2013/0209785 | A1 | 8/2013 | Cadet et al. | |
| 2013/0282115 | A1 | 10/2013 | Ishak | |
| 2013/0293825 | A1 | 11/2013 | Trajkovska et al. | |
| 2014/0300857 | A1 | 10/2014 | Cohen-Tannoudji et al. | |
| 2014/0368788 | A1 * | 12/2014 | Cado | G02C 7/02 351/159.01 |
| 2015/0153591 | A1 | 6/2015 | Croft et al. | |
| 2016/0017218 | A1 | 1/2016 | Kojima et al. | |
| 2016/0154254 | A1 * | 6/2016 | Bolshakov | G02B 1/115 351/159.66 |
| 2016/0209678 | A1 | 7/2016 | Nishimoto | |
| 2016/0304752 | A1 | 10/2016 | Yamada | |
| 2016/0320638 | A1 * | 11/2016 | Jallouli | G02C 7/108 |
| 2017/0075040 | A1 * | 3/2017 | Bolshakov | G02C 7/022 |
| 2017/0235034 | A1 | 8/2017 | Cefalo et al. | |

FOREIGN PATENT DOCUMENTS

| | | | |
|---|---|---|---|
| JP | 2014-000820 | A | 1/2014 |
| JP | 2014-38247 | A | 2/2014 |
| JP | 2015-143792 | A | 8/2015 |
| JP | 6246369 | B2 | 12/2017 |
| WO | 2008/106449 | A1 | 9/2008 |
| WO | 2012/074125 | A1 | 6/2012 |
| WO | 2013171434 | A1 | 11/2013 |
| WO | 2014/155787 | A1 | 2/2014 |
| WO | 2014/055513 | A1 | 4/2014 |
| WO | 2014/077166 | A1 | 5/2014 |

OTHER PUBLICATIONS

Standard Test Method for Yellowness Index of Plastics. Designation D 1925-70. (Year: 1988).*

International Search Report and Written Opinion issued in related International Application No. PCT/US2015/029492 on Sep. 18, 2015.

Kodak Total Blue Lens, https://www.signetarmorlite.com/wp-content/uploads/2016/04/KodakTotalBlueLens_TradeBroch_trifold-layout.pdf; Feb. 2014.

Common Misconceptions About Blue Light and Blue Steve Mower, Common Misconceptions About Blue Light and Blue Block Lenses; https://www.readingglassesetc.com/blog/common-misconceptions-about-blue-light-and-blue-block-lenses/; dated Apr. 21, 2015.

Andrew Karp; Protecting Eyes From 'Bad' Blue Light; Vision Monday; https://www.visionmonday.com/business/labs/article/protecting-eyes-from-bad-blue-light-vm-090913/; Dated Sep. 9, 2013.

* cited by examiner

MATERIALS AND METHODS FOR MITIGATING THE HARMFUL EFFECTS OF BLUE LIGHT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This is a reissue application of U.S. Pat. No. 11,022,821, which was filed as U.S. application Ser. No. 16/173,280 filed on Oct. 29, 2018 and issued on Jun. 1, 2021, which is a continuation of U.S. application Ser. No. 15/309,122, filed on Nov. 4, 2016, now U.S. Pat. No. 10,114,233, issued on Oct. 30, 2018, which is a 371 of PCT/US2015/029492, filed on May 6, 2015, which is a continuation of U.S. application Ser. No. 14/553,213, filed on Nov. 25, 2014, now U.S. Pat. No. 9,057,887, issued on Jun. 16, 2015. PCT/US2015/029492 claims benefit of U.S. Provisional application Ser. No. 62/069,432, filed Oct. 28, 2014 and claims benefit of U.S. Provisional application Ser. No. 62/989,041, filed on May 6, 2014. The contents of U.S. application Ser. No. 16/173,280, U.S. application Ser. No. 15/309,122, PCT/US2015/029492, and U.S. application Ser. No. 14/553,213 are incorporated herein by reference in their entireties.*

BACKGROUND

The electromagnetic spectrum is the range of all possible frequencies of electromagnetic radiation, including radio waves, millimeter waves, microwaves, infrared, visible light, ultra-violet (UVA and UVB), x-rays, and gamma rays. The Earth's ozone layer absorbs wavelengths up to approximately 286 nm, shielding human beings from exposure to electromagnetic radiation with the highest energy. However, humans are exposed to electromagnetic radiation having wavelengths above 286 nm. Most of this radiation falls within the human visual spectrum, which includes light having a wavelength ranging from approximately 400 nanometers (nm) to approximately 700 nm.

The human retina responds to visible light (400-700 nm). The shorter wavelengths of visible light pose the greatest hazard to human health because they inversely contain greater energy. In particular, blue light, ranging in wavelength from approximately 400 nm to approximately 500 nm, has been shown to be the portion of the visible spectrum that produces the most photochemical damage to animal retinal pigment epithelium (RPE) cells.

Cataracts and macular degeneration have been associated with photochemical damage to the intraocular lens and retina, respectively, resulting from blue light exposure. Blue light exposure has also been shown to accelerate proliferation of uveal melanoma cells. Recent research also supports the premise that short wavelength visible light (blue light) may contribute to age related macular degeneration (AMD).

The human retina includes multiple layers. These layers, listed in order from the first exposed to any light entering the eye to the deepest, include:

1) Nerve Fiber Layer
2) Ganglion Cells
3) Inner Plexiform Layer

4) Bipolar and Horizontal Cells
5) Outer Plexiform Layer
6) Photoreceptors (Rods and Cones)
7) Retinal Pigment Epithelium (RPE)
8) Bruch's Membrane
9) Choroid When light is absorbed by the human eye's photoreceptor cells, (rods and cones) the cells bleach and become unreceptive until they recover. This recovery process is a metabolic process referred to as the "visual cycle." Absorption of blue light reverses this process prematurely, increasing the risk of oxidative damage. This reversal leads to the buildup of lipofuscin in the RPE layer of the eye. Excessive amounts of lipofuscin lead to the formation of extracellular aggregates termed "drusen" between Bruch's membrane and the RPE of the eye.

Over the course of a person's life, metabolic waste byproducts accumulate within the RPE layer of the eye due to the interaction of light with the retina. Metabolic waste byproducts include certain fluorophores, such as lipofuscin constituent A2E. As this metabolic waste accumulates in the RPE layer of the eye, the body's physiological ability to metabolize waste diminishes, and blue light stimulus causes drusen to be formed in the RPE layer. It is believed that the drusen further interfere with the normal physiology/metabolic activity, contributing to AMD. AMD is the leading cause of irreversible severe visual acuity loss in the United States and Western World. The burden of AMD is expected to increase dramatically in the next 20 years because of the projected shift in population and the overall increase in the number of ageing individuals.

Drusen hinder or block the RPE layer from providing the proper nutrients to the photoreceptors, which leads to damage or even death of these cells. To further complicate this process, it appears that when lipofuscin absorbs blue light in high quantities it becomes toxic, causing further damage and/or death of the RPE cells. It is believed that the lipofuscin constituent A2E is at least partly responsible for the short-wavelength sensitivity of RPE cells. Lipofuscin chromophore A2E exhibits a maximum absorption of approximately 430 nm. The photochemical events resulting from the excitation of A2E can lead to cell death.

From a theoretical perspective, the following events appear to take place in the eye: (1) starting from infancy and throughout life, waste buildup, including buildup of lipofuscin, occurs within the RPE; (2) retinal metabolic activity and the eye's ability to deal with this waste typically diminishes with age; (3) macular pigment typically decreases with age, thus filtering out less blue light; (4) blue light causes the accumulating lipofuscin to become toxic, damaging pigment epithelial cells.

The lighting and vision care industries have standards as to human vision exposure to UVA and UVB radiation. Surprisingly, no such standard is in place with regard to blue light. For example, in the common fluorescent tubes available today, the glass envelope mostly blocks ultra-violet light but blue light is transmitted with little attenuation. In some cases, the envelope is designed to have enhanced transmission in the blue region of the spectrum. Such artificial sources of light hazard may also cause eye damage.

With a goal of protecting eyes from the potentially harmful effects of blue light, eyewear (e.g., sunglasses, spectacles, goggles, and contact lenses) configured to block blue light has been evaluated. Such eyewear typically employs a yellow dye or pigment (e.g., BPI Filter Vision 450 or BPI Diamond Dye 500) that absorbs incident blue light. As a result, such eyewear typically includes yellow tinted lenses that completely (or nearly completely) block light below a threshold wavelength (e.g., below 500 nm), while also reducing light exposure at longer wavelengths.

However, such eyewear has significant drawbacks for the user. In particular, blue blocking ophthalmic systems may be cosmetically unappealing because of a yellow or amber tint that is produced in lenses by blue blocking. To many people, the appearance of this yellow or amber tint may be undesirable cosmetically. Moreover, the tint may interfere with the normal color perception of a lens user, making it difficult, for example, to correctly perceive the color of a traffic light or sign.

Efforts have been made to compensate for the yellowing effect of conventional blue blocking filters. For example, blue blocking lenses have been treated with additional dyes, such as blue, red or green dyes, to offset the yellowing effect. The treatment causes the additional dyes to become intermixed with the original blue blocking dyes. However, while this technique may reduce yellow in a blue blocked lens, intermixing of the dyes may reduce the effectiveness of the blue blocking by allowing more of the blue light spectrum through. Moreover, these conventional techniques undesirably reduce the overall transmission of light wavelengths other than blue light wavelengths. This unwanted reduction may in turn result in reduced visual acuity for a lens user.

Conventional blue-blocking also reduces visible transmission, which in turn stimulates dilation of the pupil. Dilation of the pupil increases the flux of light to the internal eye structures including the intraocular lens and retina. Since the radiant flux to these structures increases as the square of the pupil diameter, a lens that blocks half of the blue light but, with reduced visible transmission, relaxes the pupil from 2 mm to 3 mm diameter, will actually increase the dose of blue photons to the retina by 12.5%. Protection of the retina from phototoxic light depends on the amount of this light that impinges on the retina, which depends on the transmission properties of the ocular media and also on the dynamic aperture of the pupil.

Another problem with conventional blue-blocking is that it can degrade night vision. Blue light is more important for low-light level or scotopic vision than for bright light or photopic vision, a result which is expressed quantitatively in the luminous sensitivity spectra for scotopic and photopic vision. Accordingly, blue-blocking eyewear that completely (or nearly completely) blocks incident light below a threshold wavelength (e.g., below 500 nm) can significantly impair night vision.

In addition, blue light is known to impact circadian rhythms. Melatonin (N-acetyl-5-methoxytryptamine) is a hormone secreted by the pineal gland. Melatonin, in part, regulates the sleep-wake cycle by chemically causing drowsiness and lowering the body temperature. Blue light having a wavelength of 460 to 480 nm suppresses melatonin production. Accordingly, ensuring proper levels of blue light throughout the day can be important for maintaining acceptable circadian rhythms.

Accordingly, there is a need for materials that can mitigate the harmful effects of blue light while maintaining acceptable photopic vision, scotopic vision, color vision, and circadian rhythms.

SUMMARY

Provided herein are optically transparent materials configured to block an appropriate amount of incident blue light, such that when the materials are positioned in the optical path between environmental light and the retina of a user, the optically transparent materials reduce the amount of blue light from the environmental light that reaches the retina of a user.

The materials can block an effective amount of blue light to minimize damage to retinal tissue while permitting transmission of an effective amount of maintain acceptable photopic vision, scotopic vision, color vision, and circadian rhythms. The materials can also reflect at least some incident light across a range of wavelengths centered in the blue region of the electromagnetic spectrum. This can improve the contrast and clarity of images viewed through the materials, reducing eye fatigue. In addition, the materials can be substantially neutral in color (e.g., non-yellow in color), such that the materials are not aesthetically displeasing and/or do not impair color vision when viewing objects through the materials.

The optically transparent material can comprise a substrate having a front surface and a rear surface, and a first multilayer dielectric coating disposed on the front surface of the substrate. Optionally, the material can further comprise a second multilayer dielectric coating disposed on the rear surface of the substrate.

The material can be in any suitable form which facilitates positioning of the material in the optical path between environmental light comprising blue light and the retina of a user. By way of example, the material can be in the form of an optically transparent sheet configured to cover an LED display. Alternatively, the material can be in the form of an optically transparent housing configured to cover or enclose an LED (e.g., a housing for an LED lamp). In certain embodiments, the material can be an optical lens, such as an ophthalmic lens (e.g., an eyeglass lens) for use in an ophthalmic system to be worn by a user.

The multilayer dielectric coating(s) present on the surface(s) of the material serve to reflect a portion of incident blue light, reducing the transmission of blue light across the material (e.g., from the front face of the material to the rear face of the material). In some embodiments, the front face of the material exhibits a maximum reflectance in the visible spectrum of from 5% to 30% reflectance (e.g., from 10% to 30% reflectance) at a wavelength of from 430 nm to 470 nm (e.g., at a wavelength of from 440 nm to 460 nm). In some embodiments, the front face of the material exhibits a reflectance spectrum having a full width at half maximum of from 75 nm to 125 nm. In certain embodiments, the front face of the material exhibits a reflectance of from 2% to 18% reflectance at 400 nm, of from 5% to 30% reflectance at 450 nm, and of from 3% to 20% reflectance at 500 nm. In certain embodiments, the front face of the material exhibits a reflectance of from 3% to 18% reflectance at 400 nm, of from 10% to 30% reflectance at 450 nm, and of from 4% to 20% reflectance at 500 nm.

The material can have a suitably neutral color so as to substantially impair the color vision of an individual viewing an object through the material. In some embodiments, the material can exhibit a yellowness index of 10 or less, as measured by ASTM E313-10 (e.g., a yellowness index 7 or less).

Also provided are eyeglasses, including non-prescription eyeglasses (e.g., over-the-counter reading glasses), comprising a first and second optical lens formed from a material described herein, and a frame disposed about the first optical lens and the second optical lens. In some embodiments, the eyeglasses can be over-the-counter reading glasses. In these embodiments, the first and second optical lens can have the same optical power (e.g., an optical power of from +0.0 to +3.50 diopters) with a set optical center.

Also provided are screen covers formed from a material described herein. The screen cover can be an optically transparent sheet or film configured to cover an LED display (e.g., a transparent sheet configured to cover a computer monitor, tablet screen, or cell phone screen). If desired, the screen cover can be integrated into a housing for an electronic device having an LED display. Such housings can comprise a shell configured to surround at least a portion of the electronic device, an aperture in the shell that is aligned with the LED display when the electronic device is disposed within the shell, and a membrane comprising a material described herein disposed within the aperture of the shell, such that when the electronic device is disposed within the shell, the membrane is positioned over the LED display of electronic device.

DETAILED DESCRIPTION

Provided herein are materials and methods for mitigating the harmful effects of blue light. Disclosed herein are optically transparent materials configured to block an appropriate amount of incident blue light, such that when the materials are positioned in the optical path between environmental light and the retina of a user, the optically transparent materials reduce the amount of blue light from the environmental light that reaches the retina of a user. The environmental light can be, for example, a light-emitting diode (e.g., in an LED display or an LED lamp), a fluorescent lamp, or sunlight.

The material can be in any suitable form which facilitates positioning of the material in the optical path between environmental light comprising blue light and the retina of a user. By way of example, the material can be in the form of an optically transparent sheet (e.g., having a thickness of from 0.05 mm to 1 mm, or from 0.05 mm to 0.5 mm) configured to cover an LED display (e.g., a transparent sheet configured to cover a computer monitor, tablet screen, or cell phone screen). Alternatively, the material can be in the form of an optically transparent housing configured to cover or enclose an LED (e.g., a housing for an LED lamp).

In certain embodiments, the material can be an optical lens. The optical lens can be, for example, an ophthalmic lens. Ophthalmic lenses can be corrective or non-corrective; ophthalmic lenses can also be prescription or non-prescription. The ophthalmic lens can be an eyeglass lens (i.e., a spectacle lens) for use in clear eyeglasses or tinted eyeglasses (e.g., sunglasses). In certain embodiments, the optical lens can be a non-prescription eyeglass lens for use in over-the-counter reading glasses. For example, the lens can have an optical power of from +0.0 to +3.50 diopters (e.g., an optical power of from +0.75 to +3.00 diopters). The lens can also have a set optical center. The lens can also be a non-ophthalmic lens, such as, for example, a camera lens. The camera lens can provide for improved image contrast and clarity without color distortion.

The optically transparent material can comprise a substrate having a front surface and a rear surface, and a first multilayer dielectric coating disposed on the front surface of the substrate. Optionally, the material can further comprise a second multilayer dielectric coating disposed on the rear surface of the substrate.

Figure 1:
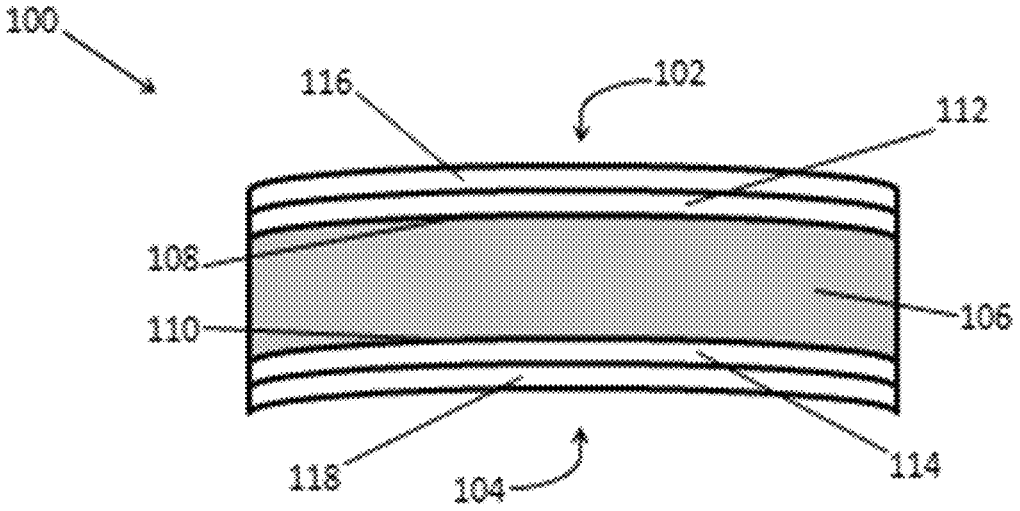
FIG. 1 is a schematic cross-sectional illustration of a material (e.g., an ophthalmic lens).

By way of example, in certain embodiments, the material can be an optical lens, such as an ophthalmic lens. Referring now to FIG. 1, the lens (100) can comprise a substrate (106) having a front surface (108) and a rear surface (110), and a first multilayer dielectric coating (112) disposed on the front surface of the substrate (108). Optionally, the lens (100) can further comprise a second multilayer dielectric coating (114) disposed on the rear surface of the substrate (110).

The multilayer dielectric coating(s) present on the surface(s) of the material serve to reflect a portion of incident blue light, reducing the transmission of blue light across the material (e.g., from the front face of the material (e.g., from the front face of the lens, FIG. 1, 102) to the rear face of the material (e.g., from the rear face of the lens, FIG. 1, 104)). The structure and composition of the multilayer dielectric coating(s) present on the surface(s) of the material can be selected so as to permit transmission of an appropriate amount of incident blue light across the material (e.g., to permit transmission of from 50% to 95% of light at 450 nm across the material, to permit transmission of from 50% to 90% of light at 450 nm across the material, to permit transmission of from 60% to 90% of light at 450 nm across the material, to permit transmission of from 70% to 90% of light at 450 nm across the material, or to permit transmission of 75% to 85% of light at 450 nm across the material).

In some embodiments, the front face of the material exhibits a maximum reflectance in the visible spectrum of from 5% to 30% reflectance at a wavelength of from 430 nm to 470 nm. In some embodiments, the front face of the material exhibits a maximum reflectance in the visible spectrum of from 10% to 30% reflectance at a wavelength of from 430 nm to 470 nm. In certain embodiments, the front face of the material can exhibit a maximum reflectance in the visible spectrum at a wavelength of from 440 nm to 460 nm.

The front face of the material can exhibit a reflectance spectrum having a full width at half maximum of at least 75 nm (e.g., at least 80 nm, at least 85 nm, at least 90 nm, at least 95 nm, at least 100 nm, at least 105 nm, at least 110 nm, at least 115 nm, or at least 120 nm). In some embodiments, the front face of the material exhibits a reflectance spectrum having a full width at half maximum of from 75 nm to 125 nm.

In some embodiments, the front face of the material exhibits a reflectance of at least 2% (e.g., at least 3%, or at least 4%) at all wavelengths of light from 400 nm to 500 nm. In certain embodiments, the front face of the material exhibits a reflectance of at least 2% at all wavelengths of light from 400 nm to 525 nm. In certain embodiments, the front face of the material exhibits a reflectance of at least 1.5% at all wavelengths of light from 400 nm to 550 nm. By reflecting light across a range of wavelengths centered in the blue region of the electromagnetic spectrum, the contrast and clarity of images viewed through the material can be enhanced.

In some embodiments, the front face of the material exhibits a reflectance of from 2% to 18% reflectance at 400 nm (e.g., of from 3% to 18% reflectance at 400 nm, of from 5% to 15% reflectance at 400 nm, or of from 7% to 15% at 400 nm). In some embodiments, the front face of the material exhibits a reflectance of from 5% to 30% reflectance at 450 nm (e.g., of from 7% to 30% reflectance at 450 nm, of from 10% to 30% reflectance at 450 nm, of from 12% to 27% reflectance at 450 nm, or of from 15% to 25% reflectance at 450 nm). In some embodiments, the front face of the material exhibits a reflectance of from 3% to 20% reflectance at 500 nm (e.g., of from 4% to 20% reflectance at 500 nm, of from 5% to 17% reflectance at 500 nm, or of from 7% to 15% reflectance at 500 nm). In certain embodiments, the front face of the material exhibits a reflectance of from 2% to 18% reflectance at 400 nm, of from 5% to 30% reflectance at 450 nm, and of from 3% to 20% reflectance at 500 nm. In certain embodiments, the front face of the material exhibits a reflectance of from 3% to 18% reflectance at 400 nm, of from 10% to 30% reflectance at 450 nm, and of from 4% to 20% reflectance at 500 nm.

The material can have a suitably neutral color so as to not substantially impair the color vision of an individual viewing an object through the material. For example, the material can be substantially non-yellow. The yellowness of the material can be quantified using a yellowness index, such as the yellowness index measured using ASTM E313-10 entitled "Standard Practice for Calculating Yellowness and Whiteness Indices from Instrumentally Measured Color Coordinates," which is incorporated herein by reference in its entirety. In some embodiments, the material can exhibit a yellowness index of 10 or less, as measured by ASTM E313-10 (e.g., 9 or less, 8.5 or less, 8 or less, 7 or less, 6.5 or less, 6 or less, 5.5 or less, 5 or less, 4.5 or less, or 4 or less). The material can be substantially free of dyes or pigments that absorb blue light (e.g., conventional 'blue blocking' organic yellow dyes such as a coumarin, a perylene, an acridine, a porphyrin, or a combination thereof). For example, the material can comprise less than 0.01% by weight of dyes or pigments that absorb blue light, based on the total weight of the material.

Figure 2:
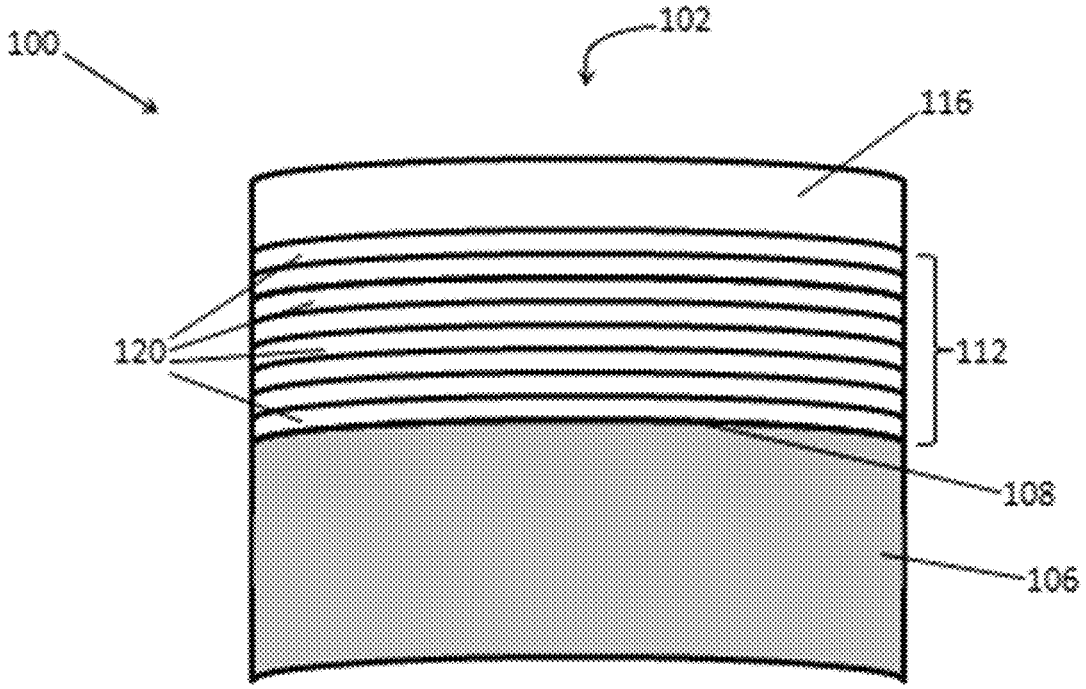
FIG. 2 is a schematic cross-sectional illustration of a material (e.g., an ophthalmic lens).

The multilayer dielectric coating disposed on the front surface of the substrate and the multilayer dielectric coating disposed on the rear surface of the substrate, when present, can each comprise a multilayer dielectric stack comprising a series of alternating discrete layers of high refractive index materials and low refractive index materials. By way of example, in certain embodiments, the material can be an optical lens, such as an ophthalmic lens. Referring now to FIG. 2, the lens (100) can comprise a substrate (106) having a front surface (108) and a multilayer dielectric coating (112) disposed on the front surface of the substrate (108). The multilayer dielectric coating (112) can comprise a plurality of dielectric layers (120) disposed on the front surface of the substrate (108).

Dielectric stacks of this type can be fabricated using suitable thin-film deposition methods. Common techniques include physical vapor deposition (which includes evaporative deposition and ion beam assisted deposition), chemical vapor deposition, ion beam deposition, molecular beam epitaxy, and sputter deposition. The overall thickness of the multi layer dielectric coating disposed on the front surface of the substrate and the multilayer dielectric coating disposed on the rear surface of the substrate, when present, can range from 1.2 microns to 6 microns.

The number of alternating dielectric layers as well as the composition of the layers in the dielectric coating can be varied so as to provide a material exhibiting the desired level of blue blocking for a particular application. In some cases, the first multilayer dielectric coating and/or the second dielectric coating (when present) each comprise at least 6 dielectric layers. In certain embodiments, the first multilayer dielectric coating and/or the second dielectric coating (when present) can comprise from 6 to 10 dielectric layers (e.g., 6 dielectric layers, 7 dielectric layers, 8 dielectric layers, 9 dielectric layers, or 10 dielectric layers).

Each dielectric layers in the coating(s) can independently be formed from any suitable dielectric material, such as a metal oxide, a metal fluoride, a metal nitride, a diamond-like carbon, or a combination thereof. In some cases, the first multilayer dielectric coating and/or the second dielectric coating (when present) comprise dielectric layers that are each independently formed from a metal oxide selected from the group consisting of chromium oxide, zirconium oxide, silicon dioxide, and combinations thereof.

In particular embodiments, the first multilayer dielectric coating and/or the second dielectric coating (when present) comprise a first dielectric layer comprising chromium oxide disposed on the front surface of the substrate. In particular embodiments, the first multilayer dielectric coating and/or the second dielectric coating (when present) comprise at least two dielectric layers comprising zirconium oxide. In particular embodiments, the first multilayer dielectric coating and/or the second dielectric coating (when present) comprise at least three dielectric layers comprising silicon oxide.

If desired, the material can further comprise one or more additional coatings *116 or 118* disposed on the first dielectric coating, one or more additional coatings *116 or 118* disposed on the second dielectric coating (when present), or one or more additional coatings *116 or 118* disposed on both the first dielectric coating and the second dielectric coating. The one or more additional coatings *116 or 118* can include, for example, conventional scratch-resistant coatings, anti-fog coatings, mirror coatings, UV-protective coatings, anti-static coatings, or combinations thereof. In some embodiments, the material can further comprise a hydrophobic coating disposed on the first dielectric coating, a hydrophobic coating disposed on the second dielectric coating (when present), or a hydrophobic coating disposed on both the first dielectric coating and the second dielectric coating.

The substrate can be any suitable optically transparent material, including materials used conventionally to fabricate lenses (e.g., eyeglass lenses) and screen covers for LED devices. Examples of suitable materials include CR-39 (allyl diglycol carbonate (ADC)), TRIVEX (commercially available from PPG Industries), SPECTRALITE (commercially available from SOLA), ORMEX (commercially available from Essilor), polycarbonate, acrylic, MR-8 Plastic (commercially available from Mitsui Chemicals), MR-6 Plastic (commercially available from Mitsui Chemicals), MR-20 Plastic (commercially available from Mitsui Chemicals), MR-7 Plastic (commercially available from Mitsui Chemicals), MR-10 Plastic (commercially available from Mitsui Chemicals), MR-174 Plastic (commercially available from Mitsui Chemicals), FINALITE (commercially available from SOLA), NL4 (commercially available from Nikon), 1.70 EYRY (commercially available from Hoya), HYPER-INDEX 174 (commercially available from Optima), NL5 (commercially available from Nikon), plastics commercially available from Tokai Optical Co., Ltd., and glasses (e.g., crown glass, flint glass, PHOTOGRAY EXTRA glass commercially available from Corning, and high index glasses such as those commercially available from Zeiss). In certain embodiments, the substrate can be selected from the group consisting of a glass, allyl diglycol carbonate (ADC), a polycarbonate, a polyurethane, a thiourethane, or a combination thereof.

Also provided are eyeglasses, including non-prescription eyeglasses (e.g., over the counter reading glasses) comprising a first and second optical lens formed from a material described above, and a frame disposed about the first optical lens and the second optical lens. The lenses can have any suitable optical power. In some embodiments, the eyeglasses can be over-the-counter reading glasses. In these embodiments, the first and second optical lens can have the same optical power (e.g., an optical power of from +0.0 to +3.50 diopters, or an optical power of from +0.75 to +3.00 diopters) with a set optical center.

Also provided are screen covers formed from a material described above. The screen cover can be an optically transparent sheet or film (e.g., having a thickness of from 0.05 mm to 1 mm, or from 0.05 mm to 0.5 mm) configured to cover an LED display (e.g., a transparent sheet configured to cover a computer monitor, tablet screen, or cell phone screen). If desired, the screen cover can be integrated into a housing for an electronic device having an LED display. Such housings can comprise a shell configured to surround at least a portion of the electronic device, an aperture in the shell that is aligned with the LED display when the electronic device is disposed within the shell, and a membrane comprising a material described above disposed within the aperture of the shell, such that when the electronic device is disposed within the shell, the membrane is positioned over the LED display of electronic device.

The example below is intended to further illustrate certain aspects of the materials and methods described herein, and is not intended to limit the scope of the claims.

Examples

A multilayer dielectric coating comprising eight discrete dielectric layers was deposited on the front and rear face of a standard plastic optical lens using standard physical vapor deposition methods. The first dielectric layer in each multilayer dielectric coating was formed by deposition of chromium oxide. Subsequently, alternating layers of silicon dioxide and zirconium oxide were deposited to form the multilayer dielectric coatings on the front and rear face of the lens. Hydrophobic coatings were then deposited on the multilayer dielectric coatings on both the front and rear face of the lens.

Figure 3:
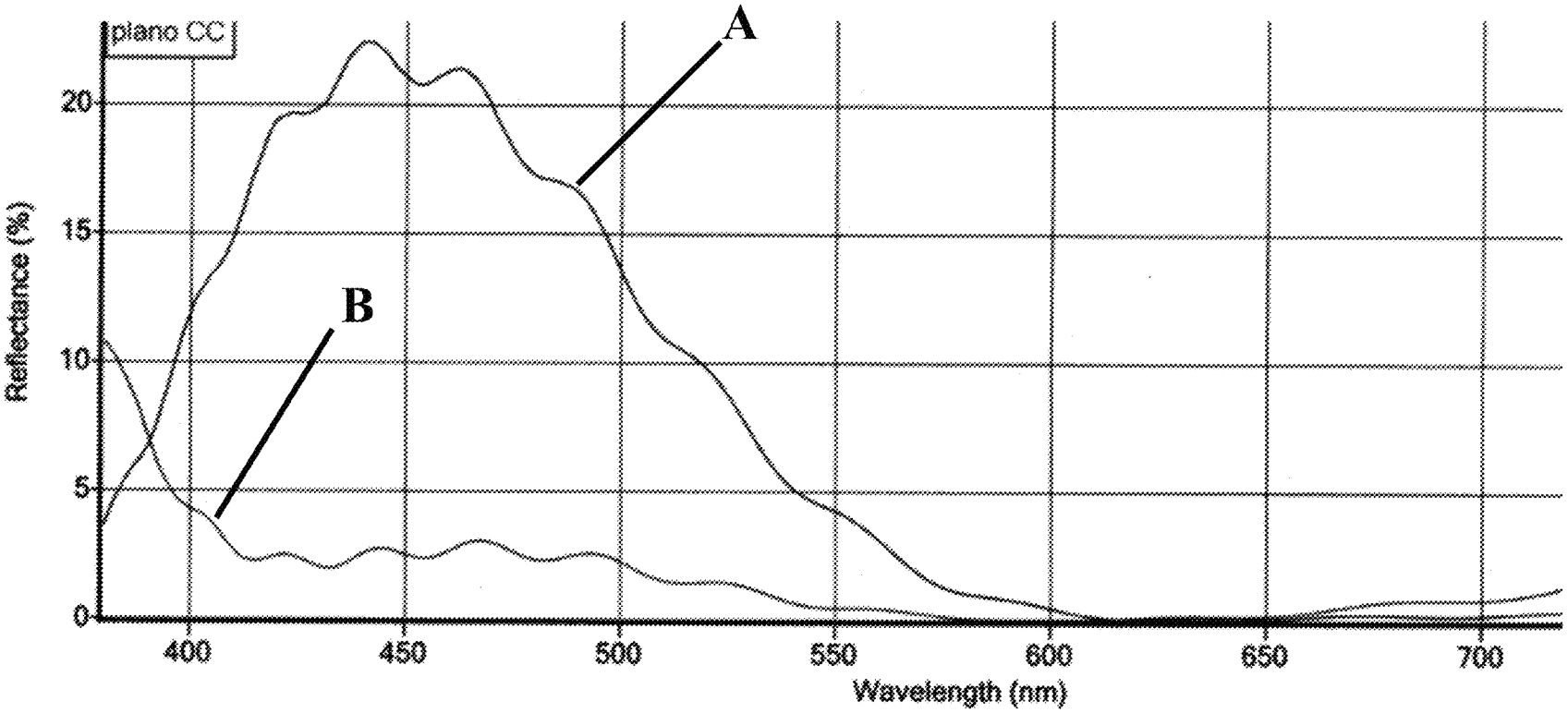
FIG. 3 is a plot of the reflectance spectrum (percent reflectance as a function of wavelength) of the front face of an ophthalmic lens (trace A) and the back face of an ophthalmic lens (trace B).

The reflectance spectrum of the front face and the rear face of the lens was measured using a Filmetrics F10-AR reflectometer. The reflectance spectrum of the front face (trace A) and the rear face (trace B) of the lens is illustrated in FIG. 3. As shown in FIG. 3, the lens reflects an effective amount of blue light to minimize damage to retinal tissue while permitting transmission of an effective amount of maintain acceptable photopic vision, scotopic vision, color vision, and circadian rhythms. Such lenses can be used in ophthalmic systems to mitigate the effects of harmful blue light, including macular degeneration and cataracts.

The materials and devices of the appended claims are not limited in scope by the specific materials and devices described herein, which are intended as illustrations of a few aspects of the claims. Any materials and devices that are functionally equivalent are intended to fall within the scope of the claims. Various modifications of the materials and devices in addition to those shown and described herein are intended to fall within the scope of the appended claims. Further, while only certain representative materials and devices disclosed herein are specifically described, other combinations of the materials and devices also are intended to fall within the scope of the appended claims, even if not specifically recited. Thus, a combination of elements, components, or constituents may be explicitly mentioned herein or less, however, other combinations of elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. An optical lens having a front face and a rear face, the *optical* lens comprising:

a substrate having a front surface and a rear surface; and a first multilayer dielectric coating disposed on the front surface of the substrate;

wherein the front face of the optical lens exhibits a maximum reflectance in the visible spectrum of from 5% to 30% reflectance at a wavelength of from 430 nm to 470 nm, wherein the front face of the optical lens exhibits a reflectance spectrum having a full width at half maximum of at least 75 nm, and wherein the optical lens exhibits a yellowness index of 10 or less, as measured by ASTM E313-10.

2. The *optical* lens of claim 1, wherein the front face of the optical lens exhibits a maximum reflectance in the visible spectrum at a wavelength of from 440 nm to 460 nm.

3. The *optical* lens of claim 1, wherein the front face of the optical lens exhibits a reflectance of from 2% to 18% at 400 nm.

4. The *optical* lens of claim 1, wherein the front face of the optical lens exhibits a reflectance of from 5% to 30% reflectance at 450 nm.

5. The *optical* lens of claim 1, wherein the front face of the optical lens exhibits a reflectance of from 3% to 20% at 500 nm.

6. The *optical* lens of claim 1, wherein the front face of the optical lens exhibits a reflectance spectrum having a full width at half maximum of from 75 nm to 125 nm.

7. The *optical* lens of claim 1, wherein the substrate is selected from the group consisting of a glass, allyl diglycol carbonate (ADC), a polycarbonate, a polyurethane, a thiourethane, or a combination thereof.

8. The *optical* lens of claim 1, wherein the optical lens comprises an eyeglass lens.

9. The *optical* lens of claim 1, further comprising a hydrophobic coating disposed on the first *multilayer* dielectric coating.

10. The *optical* lens of claim 1, wherein the first multilayer dielectric coating comprises from 6 to 10 dielectric layers.

11. The *optical* lens of claim 10, wherein the dielectric layers are each independently formed from a dielectric material selected from the group consisting of a metal oxide, a metal fluoride, a metal nitride, a diamond-like carbon, and combinations thereof.

12. The *optical* lens of [claim 1] *claim 10*, wherein the dielectric layers are each independently formed from a metal oxide selected from the group consisting of chromium oxide, zirconium oxide, silicon dioxide, and combinations thereof.

13. The *optical* lens of claim 1, wherein the first multilayer dielectric coating has a thickness of from 1.2 microns to 6 microns.

14. *optical* The lens of claim 1, wherein the first multilayer dielectric coating comprises a first dielectric layer comprising chromium oxide disposed on the front surface of the substrate.

15. The *optical* lens of claim 1, wherein the first *multilayer* dielectric coating comprises at least two dielectric layers comprising zirconium oxide.

16. The *optical* lens of claim 1, wherein the first *multilayer* dielectric coating comprises at least three dielectric layers comprising silicon oxide.

17. The *optical* lens of claim 1, further comprising a second multilayer dielectric coating disposed on the rear surface of the substrate.

18. Non-prescription eyeglasses comprising a first optical lens defined by claim 1;

a second optical lens defined by claim 1; and a frame disposed about the first optical lens and the second optical lens, wherein the first optical lens and the second optical lens have the same optical power with a set optical center.

19. Prescription eyeglasses comprising a first optical lens defined by claim 1;

a second optical lens defined by claim 1; and a frame disposed about the first optical lens and the second optical lens.

20. The *optical* lens of claim 1, wherein the *optical* lens comprises a camera lens.

*21. The optical lens of claim 1, wherein the front face of the optical lens exhibits a reflectance of from 2% to 10% at 400 nm.*

*22. The optical lens of claim 1, wherein the front face of the optical lens exhibits a reflectance of from 2% to 5% at 400 nm.*

*23. Over the counter reading glasses comprising a first optical lens having a front face and a rear face, a second optical lens having a front face and a rear face, and a frame disposed about the first optical lens and the second optical lens;*

*wherein the front face of the first optical lens and the front face of the second optical lens exhibit a maximum reflectance in the visible spectrum of from 5% to 30% reflectance at a wavelength of from 430 nm to 470 nm;*

*wherein the first optical lens and the second optical lens exhibit a yellowness index of 10 or less, as measured bv ASTM E3 13-10, and*

*wherein the front face of the first optical lens and the front face of the second optical lens exhibit a reflectance spectrum having a full width at half maximum of at least 75 nm.*

* * * * *